(12) United States Patent
De Filippis

(10) Patent No.: US 9,994,085 B2
(45) Date of Patent: Jun. 12, 2018

(54) VENTILATING UNIT, ESPECIALLY FOR MOTOR VEHICLES

(75) Inventor: Pietro De Filippis, Varazze (IT)

(73) Assignee: SPAL AUTOMOTIVE S.r.L, Correggio (Reggio (IT)

( * ) Notice: Subject to any disclaimer, the term of this patent is extended or adjusted under 35 U.S.C. 154(b) by 838 days.

(21) Appl. No.: 12/744,656

(22) PCT Filed: Nov. 19, 2008

(86) PCT No.: PCT/IB2008/054854
§ 371 (c)(1),
(2), (4) Date: Jun. 10, 2010

(87) PCT Pub. No.: WO2009/066248
PCT Pub. Date: May 28, 2009

(65) Prior Publication Data
US 2010/0291851 A1 Nov. 18, 2010

(30) Foreign Application Priority Data
Nov. 23, 2007 (IT) .............................. BO2007A0776

(51) Int. Cl.
*B60H 1/26* (2006.01)
*B60H 1/00* (2006.01)
(Continued)

(52) U.S. Cl.
CPC ........... *B60H 1/00457* (2013.01); *B60H 1/26* (2013.01); *F04D 25/0606* (2013.01);
(Continued)

(58) Field of Classification Search
CPC ...... B60H 1/00457; B60H 1/26; F04D 29/542
(Continued)

(56) References Cited

U.S. PATENT DOCUMENTS 1,722,825 A * 7/1929 Roethel .............. B60H 1/00464
248/343
1,792,514 A * 2/1931 Spear ...................... F24F 7/013
126/116 A
(Continued)

FOREIGN PATENT DOCUMENTS

CN 2055455 4/1990
DE 3316823 A1 * 11/1984
(Continued)

OTHER PUBLICATIONS

European Search Report and Opinion dated Feb. 17, 2009 from counterpart PCT patent application.
(Continued)

*Primary Examiner* — Steven B McAllister
*Assistant Examiner* — Samantha Miller
(74) *Attorney, Agent, or Firm* — Shuttleworth & Ingersoll, PLC; Timothy Klima

(57) ABSTRACT

A ventilation unit for motor vehicles comprises a tubular element (5) fitted, through an opening (4) in the chassis (1) of the motor vehicle, and a hub (8), coaxial with the tubular element (5), which mounts an electric motor (10) for driving an impeller (12) fitted with blades (15); the motor and impeller are supported by connecting means (7) which are provided between the tubular element (5) and the hub (8) and which define a grille (20) for protecting the opening (4); these connecting means are suitably shaped to define means for regulating the air flow generated by the impeller (12), in such a way as to increase efficiency and reduce noise; the unit (2) also comprises a cover (21) for protecting the motor (10), fitted with means (24) for quick connection/disconnection to/from the hub (8) and defining, between the hub and the motor, openings (26) to allow the passage of the air flow moved by the impeller in such a way as to cool the motor.

15 Claims, 4 Drawing Sheets

(51) Int. Cl.
  *F04D 25/06* (2006.01)
  *F04D 29/54* (2006.01)
  *F04D 29/64* (2006.01)
  *F04D 29/70* (2006.01)

(52) U.S. Cl.
  CPC ......... *F04D 29/542* (2013.01); *F04D 29/646* (2013.01); *F04D 29/703* (2013.01)

(58) Field of Classification Search
  USPC ... 454/69, 105, 112, 114, 117, 338, 136, 91, 454/92, 101, 106, 156, 107
  See application file for complete search history.

(56) References Cited

U.S. PATENT DOCUMENTS

| | | | |
|---|---|---|---|
| 2,619,021 A | 11/1952 | Pfautsch | |
| 2,881,688 A | 4/1959 | Breen | |
| 3,237,545 A * | 3/1966 | Gillick et al. | 454/105 |
| 4,062,273 A * | 12/1977 | O'Connor | 454/105 |
| 4,579,090 A * | 4/1986 | Konrath et al. | 123/41.02 |
| 4,605,277 A * | 8/1986 | DeFilippis | H01R 43/20 439/444 |
| 5,217,353 A * | 6/1993 | De Filippis | F04D 25/082 417/354 |
| 5,342,167 A | 8/1994 | Rosseau | |
| 5,370,576 A | 12/1994 | Krofchalk | |
| 5,588,814 A * | 12/1996 | De Filippis | F04D 25/0613 417/423.12 |
| 5,703,549 A * | 12/1997 | Guidi | H01H 50/305 335/105 |
| 5,825,108 A * | 10/1998 | De Filippis | H02K 21/22 310/12.31 |
| 6,024,536 A | 2/2000 | Tsubakida et al. | |
| 6,163,122 A * | 12/2000 | De Filippis | H02K 16/04 310/184 |
| 6,313,557 B1 * | 11/2001 | De Filippis | H02K 1/148 310/261.1 |
| 6,426,601 B1 * | 7/2002 | De Filippis | B60H 1/00428 180/65.22 |
| 6,847,149 B2 * | 1/2005 | De Filippis | H02K 1/146 310/216.008 |
| 6,864,653 B2 | 3/2005 | Heydt | |
| 6,924,570 B2 * | 8/2005 | De Filippis | H02K 3/522 310/260 |
| 7,042,121 B2 * | 5/2006 | De Filippis | F04D 25/082 310/52 |
| 7,166,023 B2 * | 1/2007 | Haigh et al. | 454/136 |
| 7,352,094 B2 | 4/2008 | Winkler | |
| 7,388,347 B2 * | 6/2008 | De Filippis | H02P 27/06 318/809 |
| 7,397,237 B2 * | 7/2008 | Hochhausen | H02P 6/16 324/173 |
| 7,518,334 B2 * | 4/2009 | Hochhausen | H02P 6/16 318/599 |
| 7,819,640 B2 * | 10/2010 | Kalavsky | F04D 29/426 417/369 |
| 7,977,831 B2 * | 7/2011 | De Filippis | F04D 25/082 310/58 |
| 8,016,574 B2 * | 9/2011 | De Filippis | F04D 25/082 310/59 |
| 8,018,188 B2 * | 9/2011 | Schwarzkopf | H02P 6/18 318/254.1 |
| 8,022,590 B2 * | 9/2011 | De Filippis | H01R 39/46 310/239 |
| 8,100,665 B2 * | 1/2012 | De Filippis | F04D 29/384 416/238 |
| 8,362,662 B2 * | 1/2013 | De Filippis | H02K 1/185 29/596 |
| 8,384,256 B2 * | 2/2013 | De Filippis | H02K 3/522 310/64 |
| 8,476,855 B2 * | 7/2013 | De Filippis | H02P 6/182 318/400.01 |
| 8,896,170 B2 * | 11/2014 | De Filippis | H02K 3/522 310/179 |
| 8,981,616 B2 * | 3/2015 | De Filippis | H02K 5/148 310/242 |
| 8,985,970 B2 * | 3/2015 | Spaggiari | F04D 29/263 417/423.1 |
| 9,148,044 B2 * | 9/2015 | De Filippis | F04D 25/08 |
| 9,543,795 B2 * | 1/2017 | De Filippis | H02K 1/2773 |
| 2005/0271529 A1 * | 12/2005 | Stommel et al. | 417/423.14 |
| 2006/0257252 A1 * | 11/2006 | Savage | 415/191 |

FOREIGN PATENT DOCUMENTS

| | | |
|---|---|---|
| DE | 19751042 A1 | 5/1998 |
| DE | 19948074 A1 | 4/2000 |
| EP | 499166 A1 * | 8/1992 |
| EP | 1314894 A2 | 5/2003 |
| GB | 2344619 A | 6/2000 |
| WO | 2006059204 | 6/2006 |

OTHER PUBLICATIONS

First Office Action dated Mar. 5, 2012 from counterpart Chinese application.
Second Office Action dated Jan. 31, 2013 from counterpart Chinese application.
CN Office Action dated Dec. 17, 2014 from counterpart CN App No. 200880117419.8.
CN Office Action dated Aug. 5, 2015 from counterpart CN App No. 200880117419.8.
Thomas Carolus "Fans, Aerodynamic Design, Sound Prediction, Construction", 1 edition, Apr. 2003.
Counterpart European Opposition proceeding from EP App No. 08851590.3 [Submitted in 2 parts].

* cited by examiner

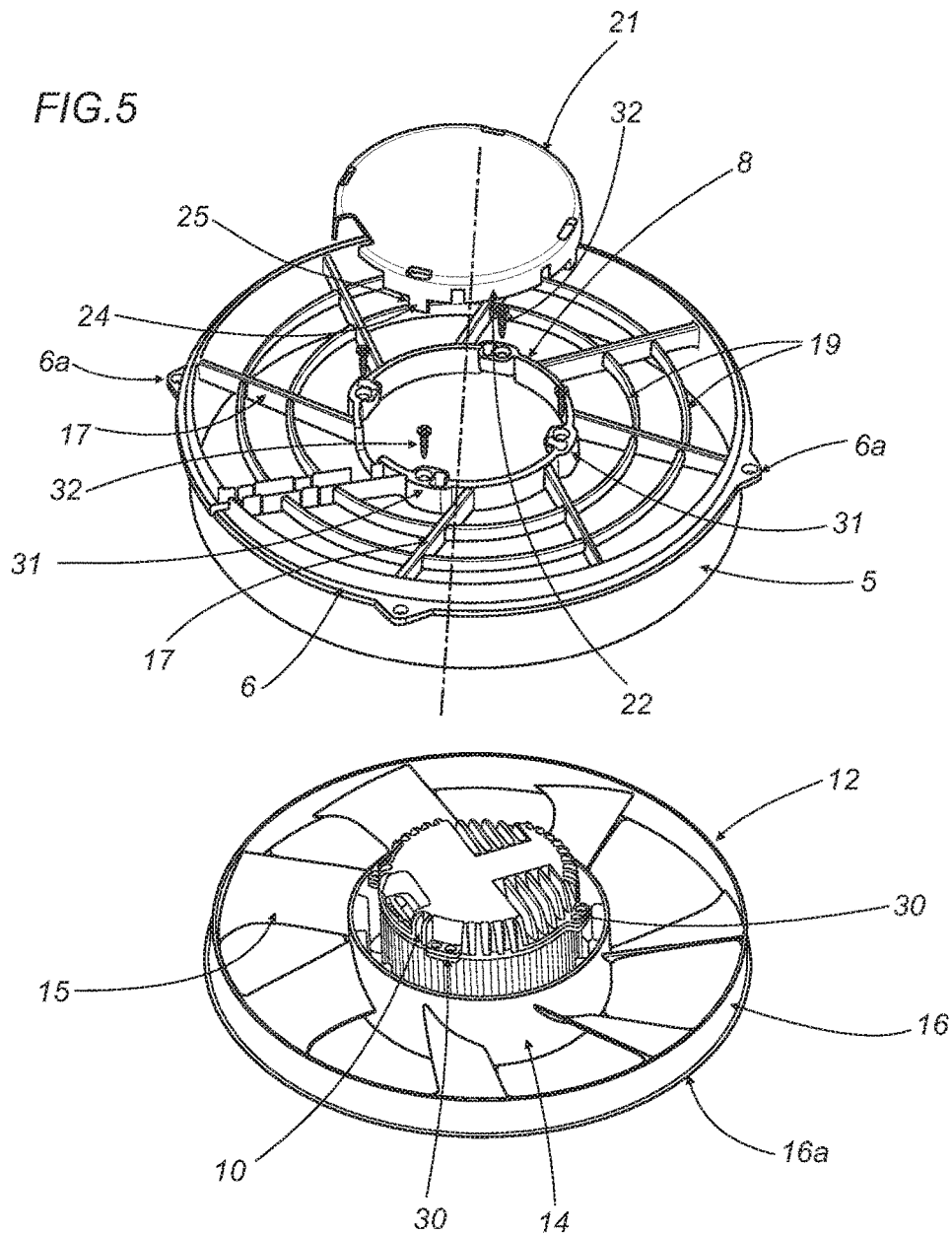

VENTILATING UNIT, ESPECIALLY FOR MOTOR VEHICLES

CROSS-REFERENCE TO RELATED APPLICATIONS

This application is the National Phase of International Application PCT/IB2008/054854 filed Nov. 19, 2008 which designated the U.S. and that International Application was published under PCT Article 21(2) in English.

This application claims priority to Italian Patent Application No. BO2007A000776 filed Nov. 23, 2007, and PCT Application No. PCT/IB2008/054854 filed Nov. 19, 2008, which applications are incorporated by reference herein.

TECHNICAL FIELD

This invention relates to a ventilating unit, especially for motor vehicles, and more specifically relates to a ventilating unit of the type used in air conditioning systems for buses and similar vehicles.

BACKGROUND ART

In prior art air conditioning systems of this kind, batteries of ventilators are used, each of which comprises a tubular element fitted in a circular opening in the roof of the vehicle.

This tubular element is fitted with a plurality of radial arms which support a coaxial hub housing an electric motor whose output shaft drives an impeller or fan comprising a plurality of blades.

As is also known in prior art, these supporting arms are suitably shaped to regulate the flow of air generated by the impeller, thus improving the efficiency of the conditioning system and forming a fan duct together with the tubular element.

To protect the motor and prevent foreign objects from finding their way into the tubular element, with the risk of jamming the impeller, the circular opening in the vehicle roof is closed by a protective grille.

Looking in more detail at prior art, in a first solution, the tubular element and the motor are mounted in such a way that the impeller faces the outside of the vehicle, while the motor base extends into the vehicle. In this case, the fan is suitably protected by the grille which prevents access to the impeller blades.

In a second solution, the fan duct and the motor base extend outwards from the vehicle, while the impeller is inside the vehicle.

In this solution, too, the fan duct is protected by a grille which prevents foreign objects from finding their way into the tubular element.

These prior art solutions have inherent shortcomings, however.

Besides the obvious costs of making and assembling the protective grilles, these grilles counteract the action of the air flow regulating means, thus drastically reducing system efficiency.

Moreover, the grille also increases the noise produced by the ventilation system.

DISCLOSURE OF THE INVENTION

This invention therefore has for an aim to provide a ventilation unit, in particular for motor vehicles, which overcomes the above mentioned shortcomings of prior art.

According to the invention, the above aim is achieved by a ventilation unit, in particular for motor vehicles, as described in any of the appended claims.

BRIEF DESCRIPTION OF THE DRAWINGS

The technical characteristics of the invention, with reference to the above aims, are clearly described in the claims below and its advantages are apparent from the detailed description which follows, with reference to the accompanying drawings which illustrate a preferred embodiment of the invention provided merely by way of example without restricting the scope of the inventive concept, and in which:

FIG. 5 is an exploded view of the ventilation unit of FIG. 3;

DETAILED DESCRIPTION OF THE PREFERRED EMBODIMENTS OF THE INVENTION

Figure 1:
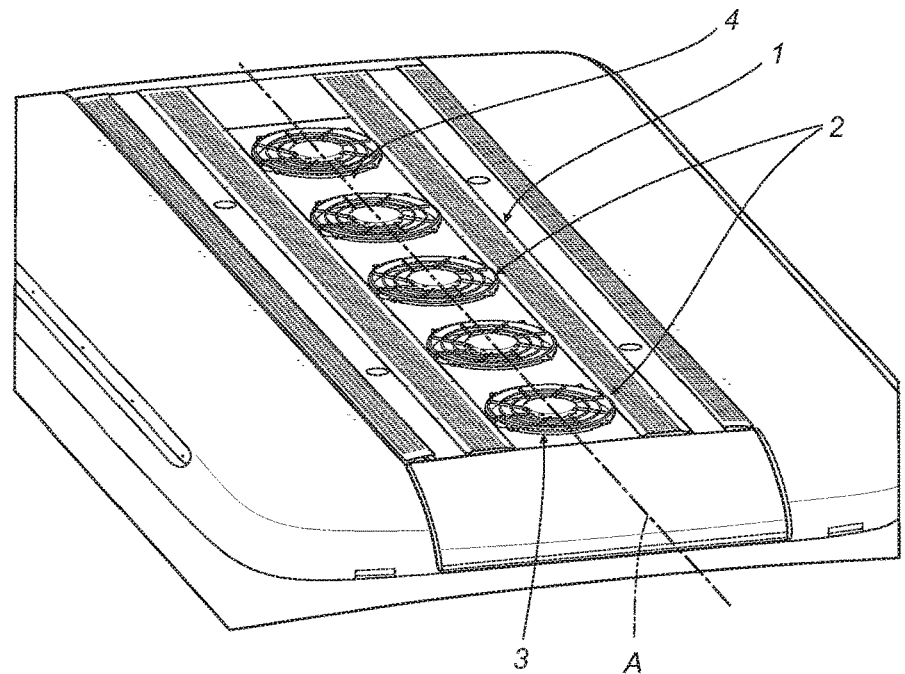
FIG. 1 is a perspective view of a part of the roof of a motor vehicle, in particular a bus, fitted with a ventilation unit made according to this invention.
Figure 2:
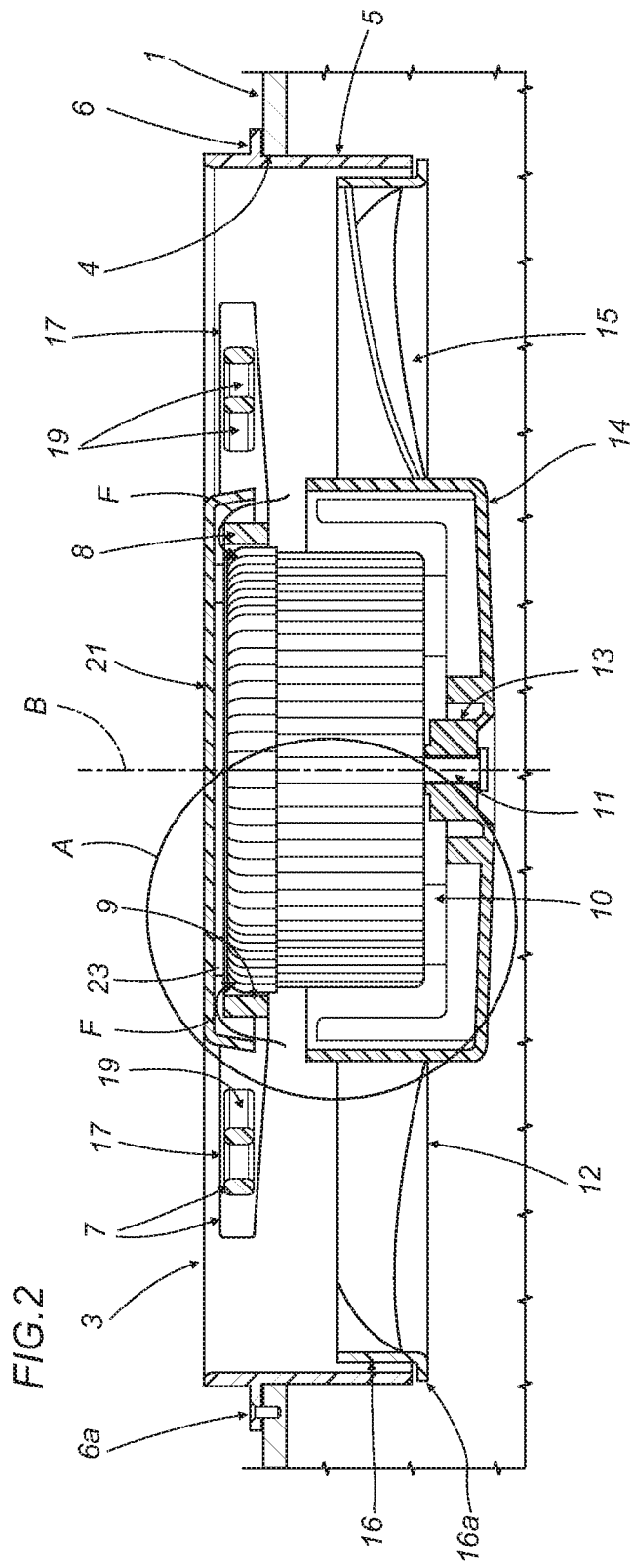
FIG. 2 illustrates a ventilation unit according to the invention in a side view with some parts in cross section and other parts cut away for greater clarity.

With reference to FIGS. 1 and 2, the numeral 1 denotes a part of the roof of a motor vehicle, for example a bus.

The roof 1 constitutes the support of a battery 2 of ventilation units 3 aligned along an axis A and housed in circular openings 4 made in the roof 1 in order to extract heat from the vehicle.

Each ventilation unit 3 comprises a tubular element 5, with an axis B, mounted with the axis B itself transversal to the plane made by the roof 1, and fitted in a respective circular opening 4.

The ventilation unit 3 has, in particular on the outside of the tubular element 5, an annular protrusion 6 by which it is supported on the roof 1 in such a way that its lower end extends into the motor vehicle.

As illustrated, the annular protrusion 6 has a plurality of protuberances 6a for fastening the ventilation unit 3 to the chassis 1.

The tubular element 5 is provided with connecting means, labelled 7 in their entirety, by which it supports a cylindrical hub 8 coaxial with it and forming a cylindrical housing 9 in which is mounted an electric motor 10 whose output shaft 11 imparts rotational motion to an impeller 12.

As illustrated in FIG. 5, the motor 10 has a plurality of ridges 30 designed to be coupled to corresponding enlarged portions 31 formed on the hub 8 using fastening means 32 of substantially known type, also shown in FIG. 5.

The impeller 12 comprises a hub 14 having a central cylindrical block 13 fixed directly to the shaft 11, and a plurality of substantially radial blades 15 fixed at one end to the hub 14 and at the other end to a ring 16 whose diameter approximates the diameter of the tubular element 5.

The ring 16 extends inside the tubular element 5 and has, on its lower edge, looking at FIG. 2, an annular protrusion 16a that is substantially the same in diameter as the tubular element 5.

The connecting means 7 are located at substantially the same level as the upper end, looking at FIG. 2, of the tubular element 5.

Figure 3:
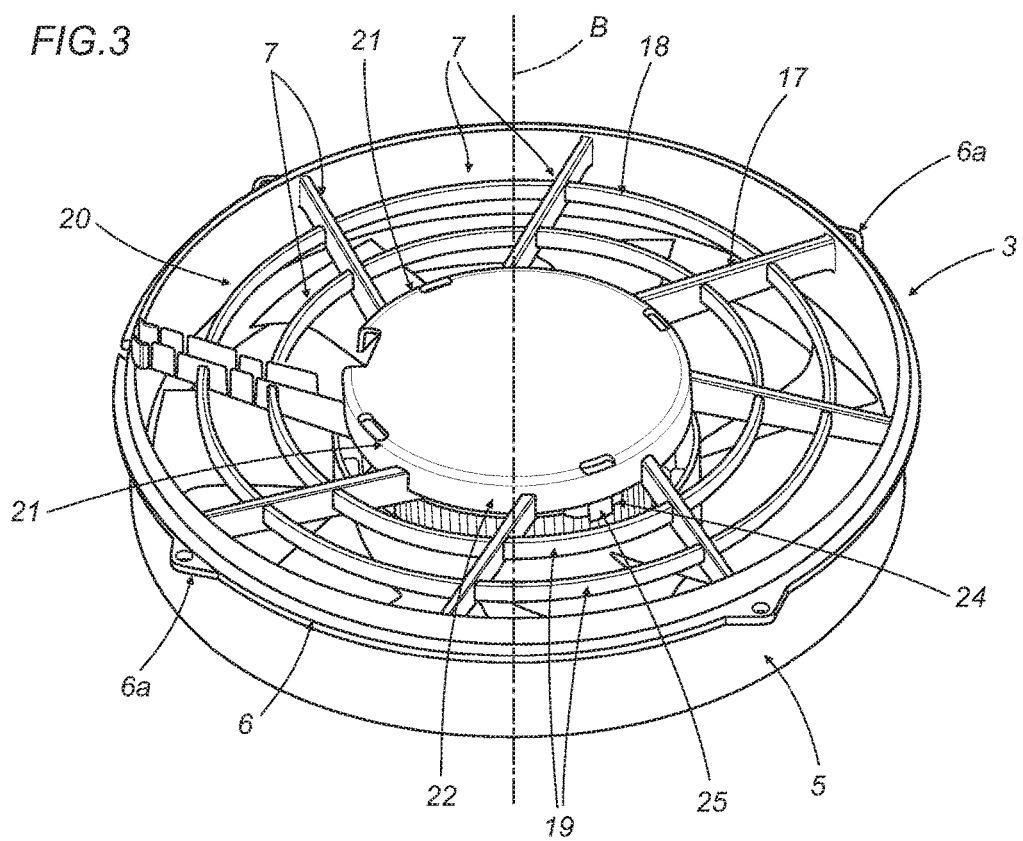
FIG. 3 is a schematic perspective view of a ventilation unit according to the invention.

As illustrated in particular in FIG. 3, the connecting means 7 comprise a plurality of connecting arms 17 between the hub 8 and the tubular element 5.

Figure 6:
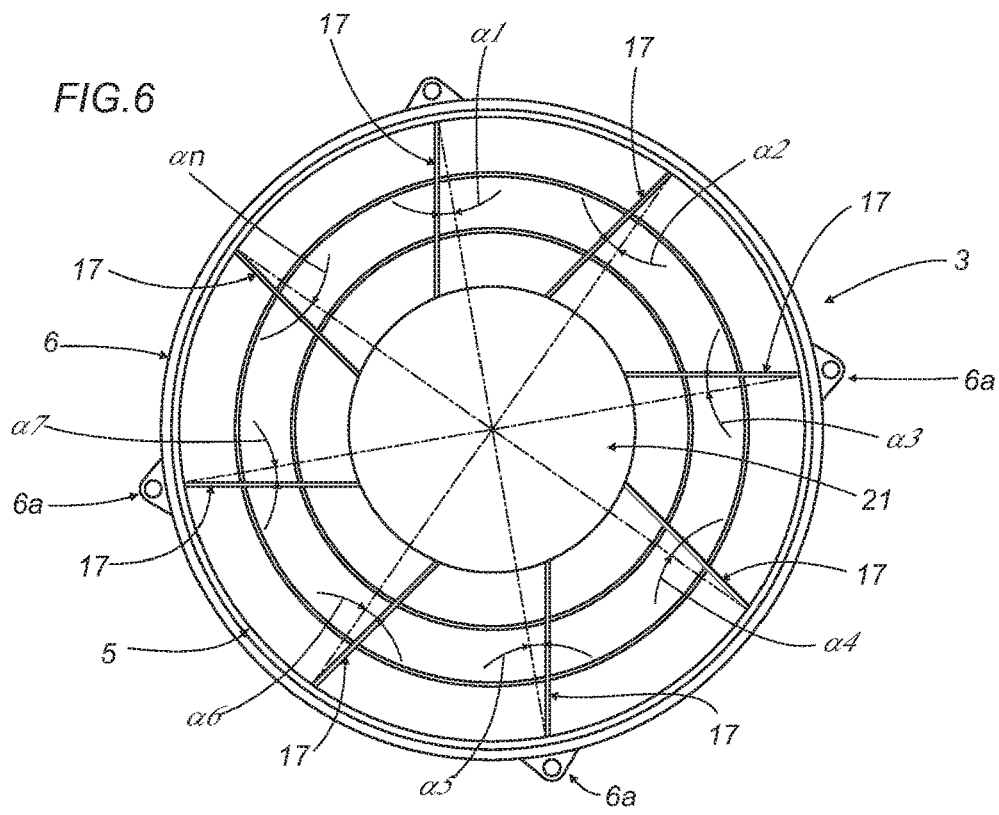
FIG. 6 shows the ventilation unit of FIG. 3 in a schematic top plan view with some parts cut away in order to better illustrate others.

FIG. 6 in particular shows how each arm 17 makes an angle $\alpha 1, \ldots, \alpha n$ with a corresponding radius intersecting the arm 17 itself, substantially on the tubular element 5.

In other words, each arm 17 makes with a corresponding radius an angle $\alpha 1, \ldots, \alpha n$ at the circumference of the circle corresponding, in practice, to the tubular element 5.

In the embodiment illustrated, all the angles $\alpha 1, \ldots, \alpha n$ are equal.

It should also be noticed that the arms 17 are located at equal angular intervals.

In other embodiments, the arms 17 might be angularly spaced by unequal angles.

The arms 17 are connected to each other by arcuate laminar elements 18 together defining a plurality of concentric rings 19.

The radial arms 17 and rings 19 together form a grille 20 having the shape of a circular crown that rigidly connects the tubular element 5 to the hub 8.

The radial arms 17 and rings 19 are suitably shaped to form means for regulating the air flow which the impeller 12 forces into the vehicle from the outside through the tubular element 5. It should also be noticed that the arcuate laminar elements 18, defining the concentric rings 19 are preferably also shaped to form air flow regulators.

The size of the angles $\alpha 1, \ldots, \alpha n$ at the circumference, whether equal or not, and the spacing of the arms 17, whether defined by equal or unequal angular intervals, combine to regulate the air flow in such a way as to optimize the performance of the ventilation unit 3.

It should be noticed that in another preferred embodiment, the arms 17 might extend radially from the hub 8, in which case the angles $\alpha 1, \ldots, \alpha n$ would be zero.

It should also be noticed that the height of the tubular element 5 is such as to maximize the air flow in axial direction, that is to say, along the axis B, minimizing the recirculation of warm air in lateral ventilation channels, not illustrated, normally formed in the zone where the ventilation unit 3 rests on the vehicle roof 1.

The numeral 21 denotes a circular cover placed over the housing 9 of the electric motor 10.

The cover 21, lying in substantially the same plane as the grille 20, is fitted on the upper edge of the hub 8, on the side of the motor 10 opposite the impeller 12, and is cup shaped.

Inside it, the cover 21 has a plurality of spacers 23, preferably arranged in a ring, to keep it at a suitable distance from the hub 8.

The edge of the cover 21, labelled 22, (FIG. 4) is fitted with means, labelled 24, for its rapid connection/disconnection so that it can be securely placed over the hub 8.

More in detail, the rapid connect/disconnect means 24 consist of flexible tabs 25 with a tooth at the free end designed to engage the lower edge of the hub 8 itself, in particular at the above mentioned enlarged portions 31.

Figure 4:
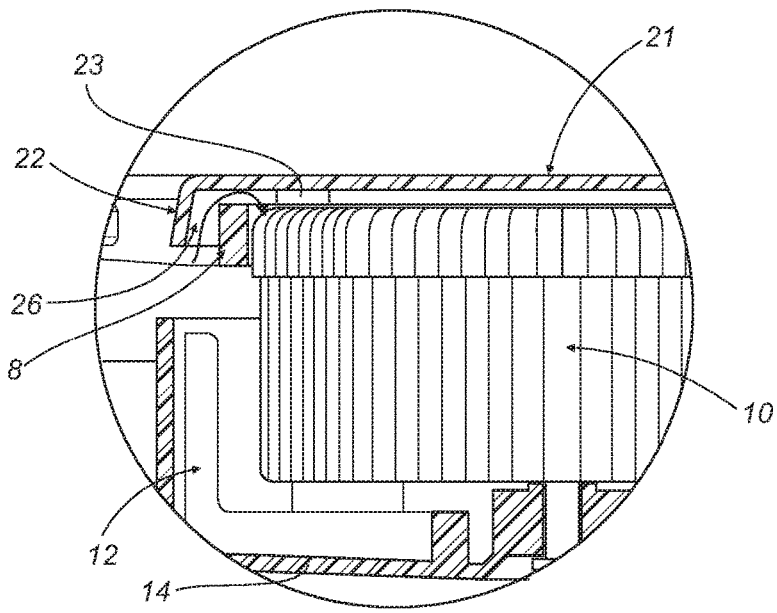
FIG. 4 illustrates the detail A from FIG. 2.

As illustrated in FIGS. 3 and 4, the openings, labelled 26, defined by the spacers 23 between the cover 21 and the hub 8, together with ducts formed in the zone where the hub 14 comes into contact with the central, cylindrical block 13 and, respectively, with the motor 10, permit circulation of an air flow F necessary to cool the motor 10, especially at the back of the latter.

The ventilation unit according to the invention, as described above, has obvious advantages.

Eliminating the traditional protective grille placed over the air flow regulating means makes it possible not only to decrease production costs but also to improve system efficiency and to reduce noise. Moreover, the grille 20 can be considered as a flow regulator proper, suitably shaped to increase efficiency and reduce noise.

Lastly, it should be noticed that the grille 20 forms an integral part of the ventilation unit 3 and not only protects the unit but also supports the motor 10 and the impeller 12.

The invention described above is susceptible of industrial application and may be modified and adapted in several ways without thereby departing from the scope of the inventive concept. Moreover, all details of the invention may be substituted by technically equivalent elements.

The invention claimed is:

1. A motor vehicle ventilation system comprising:
a panel of a motor vehicle body having an exterior surface directly exposed to an exterior of the motor vehicle body and an interior surface facing an interior of the motor vehicle body, the panel including an opening to permit airflow from the exterior of the motor vehicle body to the interior of the motor vehicle body;
an electric motor having an output shaft and a motor housing in which the electric motor is internally mounted;
a tubular element mounted directly to the panel of the motor vehicle body and positioned to extend through the opening such that the tubular element extends outwardly of the exterior surface of the panel into the exterior of the motor vehicle body and extends internally of the interior surface of the panel into the interior of the motor vehicle body, the tubular element including an inner circumferential surface;
a hub, coaxial with the tubular element and defining a housing that accommodates the electric motor;
an impeller fitted with blades, coaxial with the hub and mounted on the output shaft of the electric motor;
a mounting mechanism for mounting the electric motor and the blade impeller, the mounting mechanism comprising a grill connecting between the tubular element and the hub and entirely supporting the electric motor on the tubular element, the grill directly exposed to the exterior of the motor vehicle body to prevent ingress of objects into the opening from the exterior of the motor vehicle body, the grill shaped to act as a flow regulator for regulating airflow produced by the impeller;
at least a portion of the tubular element being positioned directly radially outwardly from the blades;
at least a portion of the tubular element being positioned directly radially outwardly from the grill;
wherein the grill comprises a plurality of connecting arms between the hub and the tubular element and a plurality of arcuate laminar elements for connecting the arms, the arcuate laminar elements shaped as concentric rings and forming the flow regulator to create a laminar flow through the concentric rings;
the tubular element having a height greater than a height of the opening to maximize the airflow in an axial direction of the tubular element to minimize recirculation of warm air in lateral ventilation channels of the motor vehicle body proximate the tubular element;
an entirety of the grill being positioned both radially inwardly of the inner circumferential surface of the tubular element and within an axial extent of the inner circumferential surface of the tubular element;

an entirety of the electric motor and the motor housing being positioned axially inwardly of an axially outwardly-most edge of the tubular element;

wherein each arm makes, with a corresponding radius, an angle ($\alpha 1, \ldots, \alpha n$) at a circumference of a circle corresponding to the tubular element.

2. The motor vehicle ventilation system according to claim 1, wherein the arms extend radially from the hub.

3. The motor vehicle ventilation system according to claim 1, wherein the arms are spaced at equal angular intervals.

4. The motor vehicle ventilation system according to claim 1, wherein the arms are spaced at unequal angular intervals.

5. The motor vehicle ventilation system according to claim 1, and further comprising a cover separate from the motor and spaced apart from the motor for protecting the electric motor, the cover positioned coaxial with the hub over the electric motor while leaving a majority of the grill positioned radially outwardly of the cover directly exposed to the exterior of the motor vehicle body.

6. The motor vehicle ventilation system according to claim 5, wherein the cover is mounted on the hub with interposed spacers to create a gap between the cover and hub for allowing a flow of cooling air to pass through the gap, the cover including an axially extending side portion extending in an overlapping manner over the hub such that the gap also extends axially between the hub and the cover in a direction toward an interior of the motor vehicle body such that the cooling air must first flow axially through the tubular element before entering the gap.

7. The motor vehicle ventilation system according to claim 6, wherein the cover is circular and is positioned over the housing of the electric motor.

8. The motor vehicle ventilation system according to claim 6, wherein an outer periphery of the blades is positioned entirely within the axial extent of the tubular element.

9. The motor vehicle ventilation system according to claim 5, wherein the cover comprises a quick connect and disconnect mechanism allowing it to be positioned and removed.

10. The motor vehicle ventilation system according to claim 1, wherein all the angles ($\alpha 1, \ldots, \alpha n$) at the circumference are equal.

11. The motor vehicle ventilation system according to claim 1, wherein the angles ($\alpha 1, \ldots, \alpha n$) at the circumference comprise at least one angle ($\alpha 1, \ldots, \alpha n$) that differs from the others.

12. The motor vehicle ventilation system according to claim 5, wherein the cover is circular and is positioned over the housing of the electric motor.

13. The motor vehicle ventilation system according to claim 1, wherein an outer periphery of the blades is positioned entirely within the axial extent of the tubular element.

14. A motor vehicle ventilation system comprising:
a panel of a motor vehicle body having an exterior surface directly exposed to an exterior of the motor vehicle body and an interior surface facing an interior of the motor vehicle body, the panel including an opening to permit airflow from the exterior of the motor vehicle body to the interior of the motor vehicle body;
an electric motor having an output shaft and a motor housing in which the electric motor is internally mounted;
a tubular element mounted directly to the panel of the motor vehicle body and positioned to extend through the opening such that the tubular element extends outwardly of the exterior surface of the panel into the exterior of the motor vehicle body and extends internally of the interior surface of the panel into the interior of the motor vehicle body, the tubular element including an inner circumferential surface;
a hub, coaxial with the tubular element and defining a housing that accommodates the electric motor;
an impeller fitted with blades, coaxial with the hub and mounted on the output shaft of the electric motor;
a mounting mechanism for mounting the electric motor and the blade impeller, the mounting mechanism comprising a grill connecting between the tubular element and the hub and entirely supporting the electric motor on the tubular element, the grill directly exposed to the exterior of the motor vehicle body to prevent ingress of objects into the opening from the exterior of the motor vehicle body, the grill shaped to act as a flow regulator for regulating airflow produced by the impeller;
at least a portion of the tubular element being positioned directly radially outwardly from the blades;
at least a portion of the tubular element being positioned directly radially outwardly from the grill;
wherein the grill comprises a plurality of connecting arms between the hub and the tubular element and a plurality of arcuate laminar elements for connecting the arms, the arcuate laminar elements shaped as concentric rings and forming the flow regulator to create a laminar flow through the concentric rings;
the tubular element having a height greater than a height of the opening to maximize the airflow in an axial direction of the tubular element to minimize recirculation of warm air in lateral ventilation channels of the motor vehicle body proximate the tubular element;
an entirety of the grill being positioned both radially inwardly of the inner circumferential surface of the tubular element and within an axial extent of the inner circumferential surface of the tubular element;
an entirety of the electric motor and the motor housing being positioned axially inwardly of an axially outwardly-most edge of the tubular element;
wherein the arms are spaced at unequal angular intervals.

15. A motor vehicle ventilation system comprising:
a panel of a motor vehicle body having an exterior surface directly exposed to an exterior of the motor vehicle body and an interior surface facing an interior of the motor vehicle body, the panel including an opening to permit airflow from the exterior of the motor vehicle body to the interior of the motor vehicle body;
an electric motor having an output shaft and a motor housing in which the electric motor is internally mounted;
a tubular element mounted directly to the panel of the motor vehicle body and positioned to extend through the opening such that the tubular element extends outwardly of the exterior surface of the panel into the exterior of the motor vehicle body and extends internally of the interior surface of the panel into the interior of the motor vehicle body, the tubular element including an inner circumferential surface;
a hub, coaxial with the tubular element and defining a housing that accommodates the electric motor;
an impeller fitted with blades, coaxial with the hub and mounted on the output shaft of the electric motor;
a mounting mechanism for mounting the electric motor and the blade impeller, the mounting mechanism comprising a grill connecting between the tubular element and the hub and entirely supporting the electric motor on the tubular element, the grill directly exposed to the exterior of the motor vehicle body to prevent ingress of objects into the opening from the exterior of the motor vehicle body, the grill shaped to act as a flow regulator for regulating airflow produced by the impeller;

at least a portion of the tubular element being positioned directly radially outwardly from the blades;

at least a portion of the tubular element being positioned directly radially outwardly from the grill;

wherein the grill comprises a plurality of connecting arms between the hub and the tubular element and a plurality of arcuate laminar elements for connecting the arms, the arcuate laminar elements shaped as concentric rings and forming the flow regulator to create a laminar flow through the concentric rings;

the tubular element having a height greater than a height of the opening to maximize the airflow in an axial direction of the tubular element to minimize recirculation of warm air in lateral ventilation channels of the motor vehicle body proximate the tubular element;

an entirety of the grill being positioned both radially inwardly of the inner circumferential surface of the tubular element and within an axial extent of the inner circumferential surface of the tubular element;

an entirety of the electric motor and the motor housing being positioned axially inwardly of an axially outwardly-most edge of the tubular element;

a cover separate from the motor and spaced apart from the motor for protecting the electric motor, the cover positioned coaxial with the hub over the electric motor while leaving a majority of the grill positioned radially outwardly of the cover directly exposed to the exterior of the motor vehicle body.

* * * * *